(12) United States Patent
Müller et al.

(10) Patent No.: US 12,018,942 B2
(45) Date of Patent: Jun. 25, 2024

(54) DRIVE SYSTEM IN A GEODETIC MEASUREMENT INSTRUMENT

(71) Applicant: LEICA GEOSYSTEMS AG, Heerbrugg (CH)

(72) Inventors: Benjamin Müller, St. Gallen (CH); Thomas Lienhard Schmitt, Dornbirn (AT); Christoph Herbst, Dornbirn (AT); Hannes Martin Wachter, Feldkirch (AT)

(73) Assignee: LEICA GEOSYSTEMS AG, Heerbrugg (CH)

( * ) Notice: Subject to any disclaimer, the term of this patent is extended or adjusted under 35 U.S.C. 154(b) by 980 days.

(21) Appl. No.: 16/998,958

(22) Filed: Aug. 20, 2020

(65) Prior Publication Data

US 2021/0055104 A1 Feb. 25, 2021

(30) Foreign Application Priority Data

Aug. 21, 2019 (EP) ..................................... 19192966

(51) Int. Cl.
*G01C 15/00* (2006.01)
*B25B 21/00* (2006.01)
(Continued)

(52) U.S. Cl.
CPC ............ *G01C 15/002* (2013.01); *B25B 21/00* (2013.01); *B25F 5/001* (2013.01); *G01C 1/02* (2013.01)

(58) Field of Classification Search
CPC ........ G01C 15/002; G01C 1/02; B25B 21/00; B25F 5/001
See application file for complete search history.

(56) References Cited

U.S. PATENT DOCUMENTS 5,680,208 A * 10/1997 Butler .................. G01C 15/004
356/147
5,973,788 A 10/1999 Pettersen et al.
(Continued)

FOREIGN PATENT DOCUMENTS

CN         201892533 U    7/2011
DE    20 2006 005643 U1    6/2006
(Continued)

OTHER PUBLICATIONS

Peter J. Aicher, "Winkelrekonstruktion und sensorlose Regelung von Hybridschrittmotoren," pp. 1-158, (Dec. 13, 2004).
(Continued)

*Primary Examiner* — Yaritza Guadalupe-McCall
(74) *Attorney, Agent, or Firm* — Maschoff Brennan (57) ABSTRACT

A geodetic surveying instrument to move a measurement light beam into a desired measurement direction in space, comprising at least one movement axis which is motorized, providing a positioning of the measurement direction of the geodetic surveying instrument, and an instrument-encoder at the movement axis configured for deriving the measurement direction as a measurement value of the geodetic surveying instrument. The geodetic surveying instrument comprises a transmission link of the movement axis of the geodetic surveying instrument to a motor axis of a stepper motor, which transmission link is configured with a gear reduction and a slipping clutch arrangement, and wherein the stepper motor comprises a rotational motor-encoder on its motor-axis and is driven by a motor controller that provides a field oriented control of phase currents of the stepper motor, which field orientation is derived based on the rotational motor-encoder.

12 Claims, 4 Drawing Sheets

(51) Int. Cl.
  *B25F 5/00* (2006.01)
  *G01C 1/02* (2006.01)

(56) References Cited

U.S. PATENT DOCUMENTS

| | | | |
|---|---|---|---|
| 6,504,602 B1 | 1/2003 | Hinderling | |
| 6,516,286 B1 | 2/2003 | Aebischer et al. | |
| 6,864,966 B2 | 3/2005 | Giger | |
| 6,873,407 B2 | 3/2005 | Vogel | |
| 7,039,089 B2* | 5/2006 | Kishi | G01C 15/002 33/286 |
| 7,493,699 B2* | 2/2009 | Kishi | G01C 15/002 33/286 |
| 7,643,955 B2 | 1/2010 | Weilenmann | |
| 7,864,303 B1 | 1/2011 | Benz et al. | |
| 7,911,589 B2 | 3/2011 | Siercks | |
| 7,982,859 B2 | 7/2011 | Hinderling et al. | |
| 8,031,331 B2 | 10/2011 | Meier et al. | |
| 8,365,424 B2 | 2/2013 | Laabs et al. | |
| 8,581,978 B2* | 11/2013 | Kludas | G01C 1/02 250/203.1 |
| 9,046,362 B2* | 6/2015 | Westermark | G01C 25/00 |
| 9,091,540 B2* | 7/2015 | Laabs | G01C 15/00 |
| 9,222,773 B2* | 12/2015 | Winistörfer | G01C 15/002 |
| 9,341,500 B2 | 5/2016 | Lippuner | |
| 9,366,531 B2 | 6/2016 | Böckem et al. | |
| 9,658,059 B2* | 5/2017 | Metzler | G01S 7/4812 |
| 10,260,873 B2* | 4/2019 | Faix | G01S 17/42 |
| 10,753,740 B2* | 8/2020 | Kotzur | G01C 15/008 |
| 2009/0147319 A1 | 6/2009 | Becker et al. | |
| 2010/0134596 A1 | 6/2010 | Becker | |
| 2011/0080477 A1 | 4/2011 | Trenary et al. | |
| 2012/0127455 A1 | 5/2012 | Sharp | |
| 2014/0226145 A1 | 8/2014 | Steffey et al. | |
| 2016/0146604 A1* | 5/2016 | Metzler | G01C 21/20 33/290 |
| 2018/0292209 A1* | 10/2018 | von Matern | G02B 7/008 |
| 2021/0055104 A1* | 2/2021 | Müller | B25B 21/00 |
| 2021/0123735 A1* | 4/2021 | Komposch | G01C 25/00 |
| 2021/0223042 A1* | 7/2021 | Hotz | G01S 17/42 |
| 2022/0011105 A1* | 1/2022 | Hotz | G01C 1/02 |

FOREIGN PATENT DOCUMENTS

| | | |
|---|---|---|
| EP | 0 440 833 A1 | 8/1991 |
| EP | 1 043 602 A1 | 10/2000 |
| EP | 1 081 459 A1 | 3/2001 |
| EP | 1 311 873 A1 | 5/2003 |
| EP | 1 450 128 A1 | 8/2004 |
| EP | 1 757 956 A1 | 2/2007 |
| EP | 1 882 959 A1 | 1/2008 |
| JP | H8-285575 A | 11/1996 |
| JP | 4 843 128 B2 | 12/2011 |
| WO | 2006/063739 A1 | 6/2006 |
| WO | 2007/079600 A1 | 7/2007 |
| WO | 2010/148525 A1 | 12/2010 |
| WO | 2011/064317 A2 | 6/2011 |
| WO | 2012/033892 A1 | 3/2012 |

OTHER PUBLICATIONS

Nico Boise, "Drehende Elektromotoren für Präzisionspositionierung," pp. 1-16, (Oct. 31, 2018).
European Search Report dated Feb. 14, 2020, as received in application No. 19192966.0.
Peter J. Aicher, "Winkelrekonstruktion und sensorlose Regelung von Hybridschrittmotoren," pp. 1-158, (Dec. 13, 2004) (See accompanying concise explanation).
Nico Boise, "Drehende Elektromotoren für Präzisionspositionierung," pp. 1-16, (Oct. 31, 2018) (See accompanying concise explanation).

* cited by examiner

DRIVE SYSTEM IN A GEODETIC MEASUREMENT INSTRUMENT

CROSS-REFERENCE TO RELATED APPLICATIONS

This application claims priority to European Patent Application No. 19192966.0, filed on Aug. 21, 2019. The foregoing patent application is herein incorporated by reference.

FIELD OF THE INVENTION

The invention relates to a geodetic surveying instrument and to a corresponding method driving motorized axis of a surveying instrument.

BACKGROUND

In the technical field of surveying, in particular in the area of geodesy, construction work or industrial measurements, instruments for a contactless, optical measurement by a movable measurement axis are used. These devices generally emit optical radiation in a measurement direction towards a target point or object to be measured, from which a distance and an angular position—i.e. polar coordinates of the target object—are derived and further processed, for example to derive Cartesian, Geodetic or Geospatial coordinate information. From the target object to be measured, a portion of the emitted radiation is reflected back to the device, where it is received and converted into an electrical signal for distance determination. In addition to measuring naturally existing targets, special target markers or reflectors can also be attached to the target object or, for example, a mobile measuring rod can be used as the target object. The emitted optical radiation can be used for electro-optical distance measurement using a Time-Of-Flight-(TOF), Phase-, Wave-Form-Digitizer-(WFD) or interferometric measurement principle or a combination of these principles, as described in EP 1 757 956, JP 4 843 128, EP 1 311 873, EP 1 450 128, EP 1 882 959, EP 1 043 602, WO 2006/063739 or others.

The measurement direction, e.g. in form of a measurement light beam, is therein pointed to the target, preferably by pivoting or rotating the measurement axis around two movement axis. The measurement direction is therein evaluated as an angular information. For angle determination of the aiming of a measurement or target point, the surveying instruments are usually equipped with one or more encoders, protractors or goniometers by which an angular position value reading of rotated parts of the instrument can be determined. The movements around the rotary axes of the device can be manual but are preferably motorized by an electrical drive unit.

For example, motorized Theodolites or Tachymeters, often also referred to as Total-Stations, are used for surveying with geodetic accuracy. A measurement target is aimed by an optical and/or electronic visual viewfinder and/or by some automatic target recognition and/or aiming system. The aiming is achieved by pivoting or rotating a portion of the instrument, which is comprising the viewfinder and the distance measurement unit, along two orthogonal axes with respect to an instrument base, e.g. stationed on a tripod. An important criterion in those instruments is precision and accuracy of the measurement. In the field of land surveying, tachymeters or total stations with distance measurement accuracies of a few millimeters or even less than 1 millimeter are used. The accuracy of angle measurements is usually within a range of less than 2 to 10 angular seconds, preferably 1 angular second, 0.5 angular seconds or less. Some embodiments of such instruments can e.g. be found in U.S. Pat. No. 6,873,407, CN 201892533, US 2011/080477, EP 1 081 459, US 2012/127455, U.S. Pat. No. 8,365,424, WO 2012/033892, WO 2007/079600, WO 2010/148525, or others.

As another example, 3D scanning is a very effective technology to produce a point cloud of millions of spatial measuring points of objects within minutes or seconds. In principle, such scanners are designed to measure a distance to a measuring point by means of an electro-optical and laser-based range finder. A directional deflection unit is designed in such a way that the measuring beam of the rangefinder is deflected in at least two spatial directions, whereby a spatial measuring range can be recorded. The deflection unit is usually realized in the form of a moving mirror or alternatively by other elements suitable for the controlled angular deflection of optical radiation, such as rotatable prisms, movable light guides, deformable optical components, etc. By a successive measurement of a plurality of points with distance and angle, i.e. in spherical coordinates (which can also be transformed into Cartesian coordinates for display and further processing), a point cloud is derived. An important aspect in those devices is the measurement speed of the gathering of the point cloud with a desired resolution and accuracy. Nowadays, scanners with high accuracy achieve a point accuracy in the range of 5 to 20 mm at measuring distances of less than 200 m. For distances of up to 50 m, 2 to 6 mm and for measuring distances of less than 25 m, about 1 to 4 mm, point accuracies can be achieved. In terms of direction or angle measurement accuracy, a distance of 5 mm at a distance of 50 m, for example, corresponds to an angle measurement accuracy of 20" (angular seconds) or about 100 µrad, which already represents a high level of angle measurement accuracy in state-of-the-art technology. Some embodiments of such Laser-Scanners can for example be found in DE 20 2006 005643 U1 or US 2009/147319.

Also Laser trackers are cognate instruments, mostly used e.g. in industrial surveying, e.g. for coordinative position determination of points of a component like a vehicle fuselage, etc. Such laser trackers are designed for coordinative position determination of a target point and for continuous tracking of a retro-reflective target point. A target point can be a retroreflective unit (e.g. cube prism), which is targeted by an optical measuring beam generated by a beam source of the measuring instrument. The laser beam is reflected back to the measuring instrument, which detects the reflected beam by a detection unit. By tracking the laser beam alignment, the target point can be tracked continuously and the distance and position of the target point can be determined continuously relative to the measuring instrument. Tracking can e.g. be achieved by changing the orientation of the motorized deflecting mirror used to deflect the laser beam and/or by pivoting the aiming unit, which has the beam-guiding laser optics. An emission and/or reception direction of the beam is determined by means of sensors for angle measurement which are assigned to a deflecting mirror or an aiming unit of the system. An important aspect besides the accuracy of the measurement is the tracking capability and the dynamics of movement in the tracking. In addition, when the beam is detected, a distance from the measuring device to the target point is determined, usually by means of an interferometer (e.g. according to the Fizeau principle), but alternatively also by means of transit time or phase difference measurement. The position coordinates of the target point are determined on the basis of the emission or reception direction and the distance. Examples of laser tracker designs are described in US 2014/0226145, WO 2007/079600, U.S. Pat. No. 5,973,788.

In all those instruments, the measurement direction has to be derived precisely by angular measurement units or encoders at the movement axes of the instrument. Encoders providing such high accuracy, e.g. at or below 1 arc seconds are known, such as e.g. from EP 0 440 833, WO 2011/064317, etc. providing accurate measurements with interpolation, various error compensation, self-calibration, etc. Also the motion of the movement axis has to be precise, e.g. with respect to a positioning accuracy, backlash, dynamics, smoot running, etc. Therefore, also the requirements for the motorized drive system of the movement axis are high. Different types of electrical motors have been used therefore, from magnetic Motors like DC-Motors or synchronous-motors to piezo motors, etc.—each with its advantage and disadvantage.

BRIEF DESCRIPTION OF THE INVENTION

It is therefore an object of some aspects of the present invention to improve a motorized movement axis of a geodetic surveying instrument—respectively a method for moving the axis, in particular to provide a geodetic surveying instrument with a drive system of improved characteristics.

An object therein is to reduce size and effort in the implementation of such a drive unit while maintain accuracy, e.g. by providing a compact drive unit comprising few components and preferably many standard components which can be advantageously arranged the instrument housing.

It is therein e.g. an object to provide a smooth and accurate movement and to avoid jerk, resonances, etc. in the movement as such could harm the measurement accuracy of the instrument, but still provide the required or improved dynamics Another object is to protect the mechanical system from damage, in particular in case of external forces manual movement or overload applied to the movement axis. An energy efficient propulsion of the instrument axis can also be another object.

Those objects are achieved by realizing the features of the independent claims. Features which further develop the invention in an alternative or advantageous manner are described in the dependent patent claims.

Some aspects of the present invention relate to a geodetic surveying instrument, which can for example be a Theodolite or Total-Station, a Laser-Scanner or a Laser Tracker. The instrument comprises at least one, preferably two, movement axis, which is motorized for providing a controlled positioning of a measurement direction or measurement axis of the geodetic surveying instrument. An instrument-encoder at the movement axis is therein configured to derive the measurement direction, as a measurement value of the geodetic surveying instrument that can be provided as a measurement coordinate of a measured point or target object. The measurement axis is therein preferably embodied as a laser-axis of an opto-electric distance meter, EDM or LIDAR, optionally combined with an optical or electronic visual aiming device such as a telescope or a camera. In an embodiment, the instrument can comprise a laser distance meter, which's laser beam forms at target axis that is pointed to a desired measurement direction by two preferably orthogonal movement axis which are configured to move the laser distance meter or to deflect the laser target axis. Optionally, there can also be a camera with an optical axis that at least substantially coincides with the measurement direction.

The geodetic surveying instrument comprises a transmission link of the movement axis of the geodetic surveying instrument to a motor axis of a stepper motor. According to the invention this transmission link is configured with a gear reduction and a slipping clutch arrangement. The slipping clutch can in particular be configured for providing a slip of the motor axis with respect to the movement axis when the transmitted torque exceeds a defined limit. Therein, the stepper motor comprises a rotational motor-encoder on its motor-axis and the stepper motor is driven by a motor controller of the instrument that provides a field oriented control of phase currents in windings of the stepper motor, wherein the field orientation is derived based on the rotational motor-encoder, which motor encoder is different from the instrument-encoder.

In an embodiment, the gear reduction can therein be configured with a high gear ration of e.g. at least 1:10 or 1:30 or more, which results in a substantially self-locking transmission, which means that an attempt to force a movement of the secondary side of the instrument axis will result in unduly high loads at the primary side of the gear reduction at the motor axis that could potentially cause damage or excessive wear of the mechanical system—or will fail at all.

In an example of an embodiment, the gear reduction can be configured as a worm gear drive. Specifically, an interconnection of the motor-axis comprises a worm screw (also named worm shaft) that links or meshes a worm wheel (also named gear wheel), which worm wheel is linked to the movement axis to the instrument. by the slipping clutch. In another example, the gear reduction can be configured as a planetary gear drive, configured to provide a gear reduction from the motor to the instrument axis. For example, a sun gear can be linked to the motor-axis and a carrier (or cage) can be linked to the movement axis, with the ring gear being fixed and the planet gears rolling inside. According to the invention such damage can be prevented by the slipping clutch that is arranged at the instrument axis side of the gear reduction.

In another embodiment, the gear reduction in-between the motor axis and the movement axis can comprise a biaxial gear reduction, in particular interlinked by a gear drive or belt drive or friction wheel drive, or in another embodiment there can also be a coaxial friction clutch arrangement. Therein, the slipping clutch can be embodied by the belt drive, the friction wheel or the friction clutch which is configured to slip above a defined maximum torque limit.

In yet another embodiment, an active haptic can be configured as a slipping clutch, in which a magnetic coupling is established as a link in-between two elements, which magnetic coupling is configured in such a way to slip above a defined maximum torque limit. Such can e.g. also be embodied when the motor axis and the movement axis are directly interlinked, in particular in a coaxial direct drive configuration. For example, a slipping clutch arrangement can then be configured by to be formed by defined maximum of a magnetic coupling of a rotor and a stator of the stepper motor. For example, slipping clutch of the direct drive stepper motor is configured by the stepper motor itself by a motor configuration in which an exceeding of a maximum pull torque of the motor will result in a slip in form of a loss of step of the stepper motor when the torque of the instrument movement exceeds a certain defined limit.

In a preferred embodiment, the stepper motor can be a bipolar two phase stepper motor.

The field-oriented control (FOC)-control is therein a two phase FOC-control with a Park transformation in a two phase system of the stepper motor, which can determine rotor-fixed (d,q)-coordinates.

The rotational motor-encoder can be configured with a rotational resolution that is higher than a steps per revolution count of the stepper motor, in particular e.g. about at least five to ten times higher or more. For example, with a desired position accuracy of around 3 cc or 1 arcsec and a consideration like 360°/{2^(encoder_bit_resolution)*gear_ratio}=desired_accuracy, an encoder resolution of 14 Bit (2^14) or more is a reasonable value. Still the motor-encoder can be configured with substantially less positional accuracy compared to the instrument encoder but with an improved response time compared to the instrument encoder.

In embodiment, an electronics PCB can be directly mechanically attached to an end face of the stepper motor. This electronics PCB comprises a motor driver power electronics and a motor controller unit which is comprising at least control loops for the field oriented control of the phase currents of the stepper motor, in particular embodied as a FPGA, SoC or Micro-Controller.

This electronics PCB can also mechanically comprise at least a portion of the rotational motor-encoder. Therein, the rotational motor-encoder is directly attached to the motor axis. For example, in an embodiment the rotational motor-encoder can be a magnetic angular encoder, in particular configured with a permanent magnet attached to the motor axis and a magnetic rotational encoder chip on the electronics PCB arranged and configured to derive an absolute rotational orientation of the motor axis according to a magnetic field of the permanent magnet, preferably configured as an on-axis magnetic encoder and/or embodied as a magnetic-encoder-SoC as an integrated circuit on the PCB. In another embodiment, the rotational motor-encoder can be an optical angular encoder or a capacitive angular encoder attached to the motor axis.

The instrument-encoder can therein be embodied as a high accuracy rotational encoder configured with a high positional accuracy and with an evaluation unit of the bare encoder readings which provides a calibration, error compensation and/or interpolation of its angular measurement values which are used to derive the measurement direction as results of the surveying of a target point.

The field oriented controller structure can for example be embodied as a cascaded controller comprising:
  a field oriented current controller for driving the windings of the stepper motor based on current sensors for the windings and on the motor-encoder, that is cascaded under a control input from
  a speed loop controller based on the instrument-encoder of the movement axis, that is cascaded under a control input from
  a position loop controller based on the instrument-encoder of the movement axis,
which position loop controller is provided with a desired trajectory of movement from a geodetic measurement controller of the geodetic surveying instrument.

Some aspects of the invention also relate to a corresponding method for driving a movement axis of a geodetic surveying instrument, in particular a Theodolite, Total-Station or Laser Scanner, with,
  a deriving a motor axis orientation by a rotational motor axis encoder on a motor axis of a stepper motor,
  a controlling of phase currents of the stepper motor according to a field oriented control by a motor driver, which is done by a micro-controller according to the axis encoder and the demanded torque at the motor axis.
  a transmitting a movement of the motor axis to an instrument axis, optionally by a slipping clutch as described,
  a deriving a measurement direction of the instrument by a high accuracy instrument axis encoder on the instrument axis, and
  a controlling of the motor driver according to the instrument axis encoder for a positioning of the measurement direction, in particular executed at a geodetic surveying instrument as discussed herein.

Therein, the transmitting of a movement of the motor axis to an instrument axis can be provide with a gearing down of the movement speed. In an embodiment, the motor driver can comprise H-bridge arrangements of semiconductor switches, such as field effect transistors, for controlling each of the phases of the stepper motor according to PWM signals. The PWM signals to control the two H-bridges are provided by the FOC, in particular in such a way that the duty cycle of the PWM signal is provided in such a way that the desired quadrature current and thus the desired torque is met. The FOC is therein embodied as a two phase FOC, e.g. with a transforming of two motor phase currents into a DQ vector based on the motor encoder values, and with a controlling of those DQ components to commanded desired values and then back transforming the results to two phase PWM signals for driving a voltage for each of the motor phases for converging to the desired values. The phase current controlling of the FOC can also be cascaded under a speed control loop and/or position control loop, which are based on readings from an instrument axis encoder at the instrument movement axis that is separated from the motor encoder at the motor axis.

The controlling of the motor driver can be embodied with a generating of PWM signals. The duty cycle of the PWM signal of the motor driver can be based on a desired current. The desired current can be the output of a velocity controller. The desired velocity of the velocity controller can be provided by a position controller for the measurement direction of the instrument.

In an embodiment, such can e.g. comprise providing a desired position of the instrument axis to a position controller, providing a desired velocity to a velocity controller by the position controller, providing a desired current or motor torque to an current controller by the velocity controller, wherein the current controller provides a duty cycle of PWM signals to a motor driver which is based on the desired current and actually measured phase currents, which comprises FOC-transforming to a rotor fixed coordinate system according to an angular position of the rotor that is derived by a motor axis encoder.

An embodiment of some aspects of the invention also relate to an according system providing the method, e.g. embodied as a computation unit. Such a device or system according to the present invention can comprises microcontrollers, microcomputers, DSPs or a programmable or hard-wired digital logics, etc., wherefore the present invention can involve or be embodied as a computer program product with program code being stored on a machine readable medium or embodied as an electromagnetic wave (such as e.g. a wired or wireless data signal), which implements functionality according to the invention at least partially in software—which therefore is also an embodiment of the invention.

BRIEF DESCRIPTION OF THE DRAWINGS

The devices, methods, systems, setups and computer programs according to some aspects of the invention are described or explained in more detail below, purely by way of example, with reference to working examples shown schematically in the drawing. Specifically.

DETAILED DESCRIPTION

The diagrams of the figures should not be considered as being drawn to scale. Where appropriate, the same reference signs are used for the same features or for features with similar functionalities. Different indices to reference signs are used to differentiate between different embodiments of a feature which are exemplary shown. The terms "substantially" is used to express that a feature can, but in general is not required to be realized exactly up to 100%, but only in such a way that a similar or equal technical effect can be achieved. In particular slight deviation, due to technology, manufacturing, constructional considerations, etc. can occur, while still within the meaning of the scope.

Figure 1A:
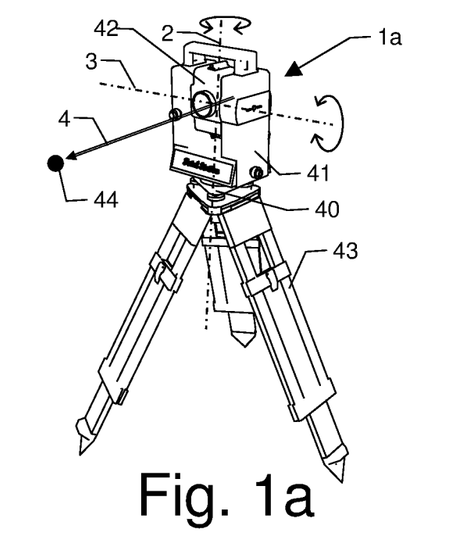
FIGS. 1a and 1b show an example of an embodiment of a surveying instrument according to the present invention.

FIG. 1a shows an example of an embodiment of a geodetic surveying instrument 1 configured as a total station 1a. In the shown example, the instrument 1 is stationed with its instrument base 40 on a tripod 43. It comprises a horizontal movement axis 2 around which an upper portion 41 of the instrument can be moved with respect to the instrument base 40. The upper part comprises a vertical movement axis 3 around which a telescope and/or distance measurement unit 42 can be moved. by this arrangement a measurement light beam of the distance measurement unit can be positioned to a desired target point 44 in a measurement direction 4. The Instrument therein comprises a rotational instrument encoder at each of the movement axis to derive a measurement value of an orientation of the measurement direction with respect to the base 40, as well as value of a distance information from the instrument to the target point, whereby 3D spatial coordinates of the target point can be derived and provided by the surveying instrument as a measurement value. Those instrument encoders provide angular measurement values of the orientation of the measurement direction, respectively the instruments movement axis in a high resolution in the range arc seconds of below. Such requires rather sophisticated rotational encoders, with advanced measurement evaluation units, which can e.g. also comprise error compensations for eccentricity, temperature drifts, encoder code errors, misalignment of encoder sensors, etc. The movement axis 2 and 3 of the instrument are therein motorized according to the present invention to provide a precise spatial positioning of the measurement direction 4 in space.

Figure 1B:
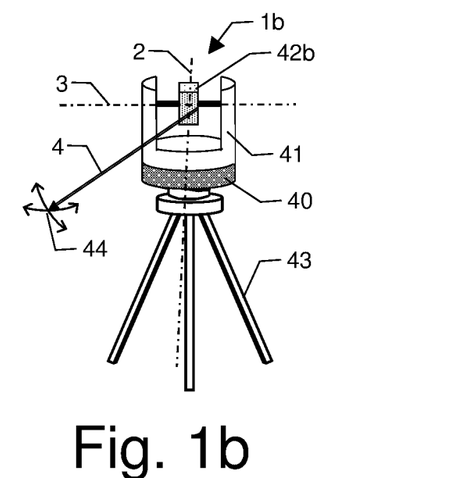

FIG. 1b shows an example of an embodiment of a geodetic surveying instrument 1 configured as a Laser scanner 1b. As a laser scanner 1b is configured to derive a point cloud with many 3D measurement points 44, it is designed to provide a fast movement of the measurement direction 4 in space during the scanning for a fast successive measurement of many target points 44 in a spatial region. Such is achieved by not moving the whole distance measurement unit 42 in at least one of the directions, but to move less inert deflection element 42b, such as a deflection mirror for the measurement light. At least one of the movement axis 2 and 3 of the instrument 1b—preferably the slow axis 2 moving the base 40 with respect to the top-portion 41, but optionally or alternatively also the fast axis 3 moving the mirror 42b with respect to the top portion 41—are therein motorized according to the present invention to provide a smooth constant speed of the movement, in particular with low jerk and low vibration values, and/or a precise spatial positioning of the measurement direction 4 in space.

Another, here not shown embodiment of a geodetic instrument according to the invention would be a Laser-Tracker.

Summarized, such a geodetic surveying instrument 1 can e.g. be configured with two movement axes, in particular a vertical axis 2 and a substantially orthogonal horizontal axis 3 (or trunnion axis), configured to aim a target axis 4 to a measurement target 44.

The target axis 4 can e.g. be configured with an optoelectronic distance meter and/or a (optical and/or electronic) telescope, for example, a Laser distance meter arranged coaxially with a line of sight of a visual aiming unit. The movement axes are configured with an instrument encoder to measure an actual orientation of the movement with geodetic accuracy, e.g. with a resolution of at least 1 arc-sec or preferably below. By the instrument encoders and the distance meter polar coordinates of the measurement target can be derived. The standing axis, as a first of the movement axis, rotates the upper structure 41 with respect to a base 40, by which base 40 the instrument can be stationed e.g. substantially horizontal on a tripod 43. The tilting axis 3, as a second of the movement axis, is comprised in the upper structure 41 and rotates the telescope 42 with the distance meter The motor control for those movements is preferably configured stiff, but such can be disadvantageous for the mechanics in case of problems such as blockings or external forces. Accordingly, a slipping clutch is introduced, whereby a stiff motor control can be established without risking mechanical damage of the high precision mechanical drive.

The present invention is using a stepper motor in high precision measurement devices which can achieve all the requirement s of such devices by the specific setup combination according to the invention making such an approach feasible and efficient. The invention provides a precise positioning and fast rotation with a dynamic range of an FOC control being much better than classic open loop stepper motor systems which are not well suited for such applications. For example, in the present field of technology, the dynamic is typical a high precise positioning below 1 arcsec up to speed of 1 Hz rotation speed of the device axis.

This is typical the dynamic range of a specifically designed piezo drive, which is costlier, has high dependencies on humidity and contamination, etc. The present invention therein also proposes to specifically shift the dynamic range of the stepper motor 8 by a specifically configured gear ration, which is not possible with a piezo drive system.

The invention provides a simple drive system with high-end specification, high dynamics and high precision positioning, which can make use of an of the shelf stepper motor. With the FOC closed-loop control, the efficiency can be increased, noise can be decreased, and any mechanical resonances are more or less not excited anymore.

Both Total Station-axes or also a Laser-Scanner Azimuth-axis are high precision axis, with the key feature of static application or very slow movements. The stepper drive according to the invention can be specifically designed for static application or high-resolution positioning. Other motors like servos or 3 phase PMSMs with 3 phase FOC controllers are designed for dynamic applications (>10 Hz) and accordingly not well suited in field of application of the present invention. The combination of the present invention combining a stepper motor 8 and the FOC 30 provides a unique feature set in surveying instruments and new possibilities of future designs with a reduction in design effort and price. This precise positioning motor with a high resolution and efficient control, combined with a slipping clutch in the mechanical drive system that prevents from damage or any disadvantage by the now possible stiffly designable positioning setup is achieved by the present invention. It provides a steeples control and movement of the stepper motor 8 without resonances and with an energy efficient control of the motor currents and motor torque in accordance with the actual demand—resulting in an overall improved dynamic behavior and positional accuracy of the instrument axis. Besides the high positional accuracy of the drive itself, the present invention also provides a desirable high stiffness by the slipping clutch that enables to make use of this newly gained stiffness and dynamic—that can be specifically adapted by a gear down transmission that does not impact accuracy—without increasing wear or risk of damage to the instrument 1.

Figure 2:
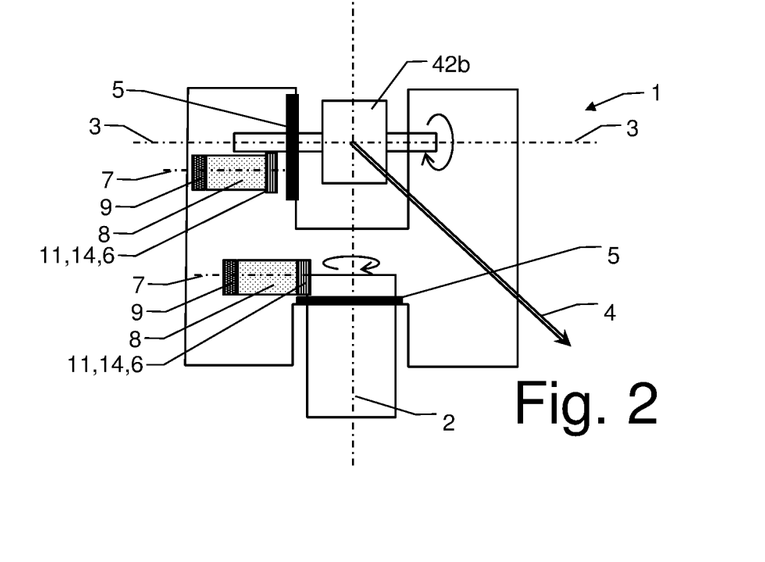
FIG. 2 shows an example of an embodiment of a stepper motor configuration in a surveying instrument drive according to the present invention.

FIG. 2 illustrates an embodiment of a movement axis drive configuration of a geodetic terrestrial measurement instrument 1 according to the invention, which is driven by an electric motor that is configured as a stepper motor 8.

The stepper motor 8 can in particular be a bipolar stepper motor as a multi-pole two phase permanent magnet motor, for example configured with at least 15 or more full steps per revolution. It can for example comprise a permanent magnet rotor configured with a number of pole pairs (or magnetic toothing) and a stator comprising two coil winding sets A and B, wherein the magnetic angle between those windings is substantially 90° with respect to the rotor magnetics.

In the here shown embodiment, the movement axis drive comprises a transmission from the motor axis 7 of the stepper motor 8 to the instruments movement axis 2 or 3 which slows down the movement of the motor 8 to a movement of the instrument axis 2 by a gear reduction transmission unit. As the rotational position value of the instrument axis 2,3 has to be preferably derived absolute within a full rotation, the instrument encoder 5 is located directly at the instrument axis 2,3 and configured to derive an orientation of the measurement direction 4 that is unambiguous with respect to a full rotation (not necessarily absolute with respect to an orientation of the base). As this embodiment comprises a gearing down, it can be preferable to provide the instrument encoder 5 directly at the instrument axis 2,3, as a transmission tends to introduce additional play, errors and tolerances, the unambiguousness and/or absoluteness about the rotation might be lost, which could degrade accuracy of the surveying instruments measurement.

A problem of prior art instruments—in particular in case of a stiffly designed control loop for the positioning of the instrument axis movement, which is generally desirable—is that a blocking of the instrument axis or applied external forces and impacts to the movement of the instrument axis, can harm the precise drive unit and the mechanics and result in damage or increased wear and degrading accuracy. An embodiment according to the invention therefore comprises a slipping clutch 6 in the drive unit of the instrument axis 2,3, which is configured to provide a maximum torque limit, above which the slipping clutch will start to slip and loosen a coupling of the instrument axis 2,3 and the motor axis 7, until the torque is below a certain level again.

The stepper motor 8 according to the invention is therein configured with a rotational encoder 9 directly linked to its motor axis 7. An unexpected difference in-between the movement of the motor axis 7 and the instrument axis 2,3 caused by the slipping clutch 6 can therein be detected by an accordingly configured monitoring unit at the instrument 1 and can provide a warning or error signal. The stepper motor 8 according the invention is field oriented controlled stepper motor, as it will be discussed in detail in the following.

An advantage that can result from FOC-drive, is also that the power consumption and accordingly instrument temperature is reduced compared to a classical full-step or micro-step approach, in which a movement current is supplied when moving or at least a holding current is supplied in standstill which is configured high enough to ensure save operation and avoid step loss even in worst case. The FOC only provides the torque and therefore current actually necessary, and can reduce the motor currents even down to substantially zero, which can save battery and avoids temperature increase. It also allows to use comparably low cost, standard motors for high precision surveying instruments, as motor deficits can be mended by the FOC-control loop. For example, classical stepper approaches can hardly achieve the demanded pointing accuracy requirements of a totals station, and also mechanical resonances of classic stepper motor drives can be problematic for surveying instruments in terms of measurement accuracy and/or dynamic movements, e.g. as such resonances can lead to step losses or even motor-stall under unfavorable conditions.

Figures 3, 4:
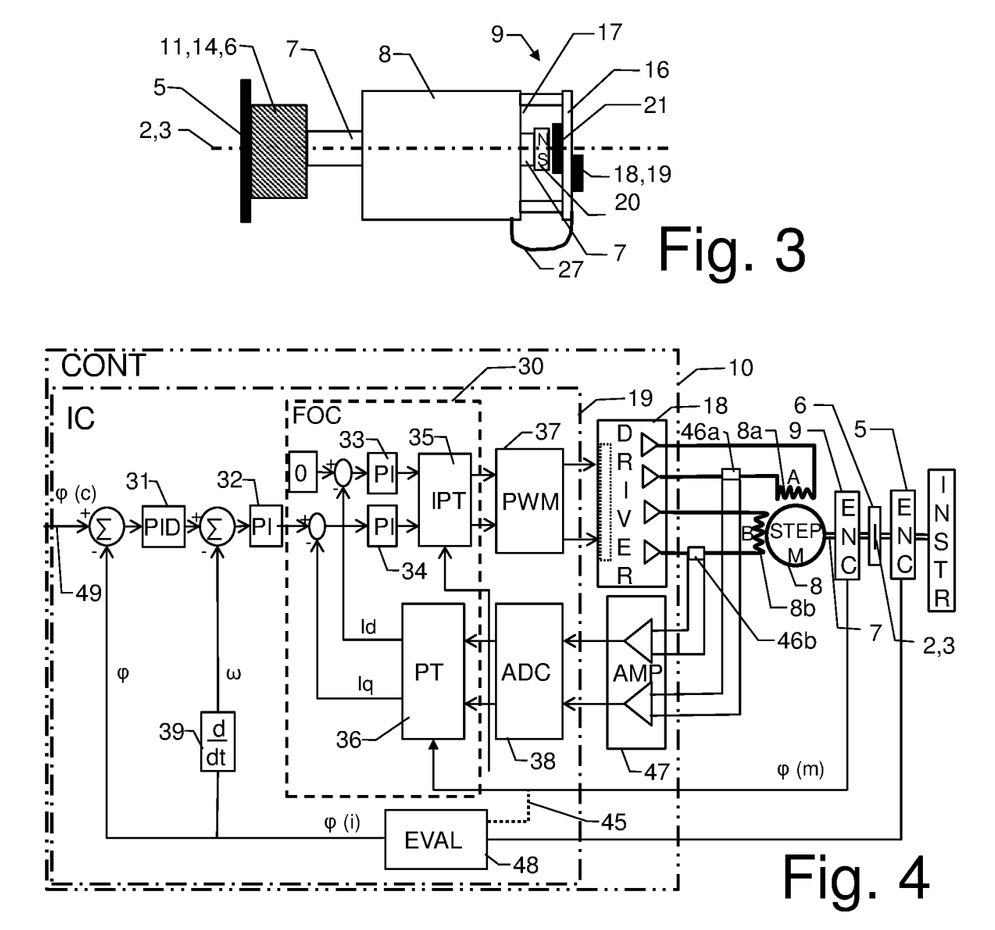
FIG. 3 shows an example of an embodiment of a drive setup according to the invention.
FIG. 4 shows an example of an embodiment of a control loop according to the invention.

FIG. 3 shows an example of an embodiment of a stepper motor configuration according to the invention, therein the stepper motor 8 is configured with a rotational encoder 9 attached to its motor axis 7, which is preferably configured to provide an absolute angular position of the motor axis 7. In the shown embodiment, this motor encoder 9 is as a magnetic encoder, comprising a permanent magnet 20 attached to the motor axis 7 and a magneto-electric sensor 21 attached to a stator of the motor 8. In the shown preferred embodiment, the magneto-electric sensor 21 is configured as at least one chip on a printed circuit board 16 (PCB) that is attached to the rear end 17 of the motor 8, opposed to the permanent magnet 20 at the motor axis 7. In other embodiments, also optical encoders, capacitive encoders, resolvers, etc. can be used as angular motor encoders. This PCB 16 can preferably also comprise power electronics for driving the phase-windings of the stepper motor 8 wired 27 to the PCB 16, as well as a controller Chip 18,19—such as a Microcontroller, FPGA or System on Chip (SoC)—that comprises the field orientation control for a motor current control loop, which is based on angular readings of the motor axis encoder 9.

Preferably, the angle of the motor axis can be measured with a resolution being substantially higher than the number of steps per revolution of the stepper motor and with a fast, substantially real time evaluation, e.g. at a sampling rate of at least about the order of magnitude of the cycle time of the FOC-control loop. For example, by a high-resolution angular encoder directly linked to the motor axis with an angular resolution of about 12 bit or more, with a sampling rate above 10 kHz, and with a dead time or reaction time below 1 ms. Alternative, but similar to the mechanical setup, the motor angle could be measured with a relative A-B-Encoder. The absolute angle must be integrated out of the relative signal (steps).

Linked to the motor-axis 7, there is the gear reduction 11 or 14 and the slipping clutch 6 linking the motor 8 to the axis 2,3 of the instrument movements.

In FIG. 4, a diagram of an example of a control loop 10 according to the invention is shown.

It comprises a bipolar stepper motor 8 with its windings A (8a) and B (8b), which are driven by power electronics 18 of the motor-driver according to a Pulse Width Modulation signal 37 (PWM), and configured for providing an electrical current in the windings 8a, 8b, e.g. by a full bridge configuration of power transistors. The electrical phase currents are measured, in this example by shunt resistors 46a, 46b and the therewith connected amplification stage 47, which can also comprise a signal filtering. The currents 46a 46b of the 90° aligned phases 8a, 8b of the stepper motor 8 are then digitized by an analog to digital converter 38 (ADC) and transformed into currents id and iq in a field oriented D-Q coordinate system of a complex stator current space vector comprising a magnetic flux and a torque of the motor, by a forward Park-transformation 36 (PT, PARK). The forward transformation 36 is therein based an angular position of the rotor of the stepper motor 8 with respect to its stator, which is derived by a rotational encoder 9 directly attached to the motor axis 7. Background on the Park-(dq0-) transformation as a projection of the phase quantities onto a rotating two-axis reference frame can be found in Literature. For example, U.S. Pat. No. 3,824,437 shows some basic principles of vector control. The motor encoder 9 is therein preferably configured for a fast reaction with low dead time to achieve a fast current control loop in or preferably above a range of many kHz. The rotational resolution of the motor encoder 9 is therein substantially higher that the number of full steps per revolution of the stepper motor 8, e.g. at least five to ten times or more. The id and iq values are then controlled by a control loop 33,34, e.g. by a PI-control loop, to desired values, of which the d-value 33 is usually controlled to zero. The output of those control loops is inversely transformed by an inverse Park transformation 35 (IPT, PARK$^{-1}$) and then converted to the PWM signals 37 which are driving the power electronics 18.

Thereby, the field oriented control (FOC) 30 of the stepper motor is provided.

This field oriented control 30 is cascaded under a control loop 10 for positioning of the instrument axis 2 (or 3) which is driven by the motor 8, as shown preferably with the slipping clutch 6 and/or a mechanical transmission in-between the motor axis 7 and the instrument axis 2,3 which moves the instrument portion that defines a measurement direction 4 of the instrument 1. The instrument axis 2,3 by which the measurement direction 4 is moved, is equipped with an instrument encoder 5 that is evaluated separately from the motor encoder 9 readings. This evaluation is done with very high accuracy, e.g. with error compensation, calibration, filtering, etc. to achieve a high positional accuracy, in or below an arcsecond range. The positional resolution of the instrument encoder is in general magnitudes higher than the one of the motor encoder 4, but in contrast, the real time requirements are more relaxed since all the signal processing 48 to achieve this high position accuracy takes evaluation and computation time.

In the shown example, there is a cascaded speed and position control loop. Therein, the angular instrument encoder 5 values are time differentiated 39 to form a speed signal which controlled to a desired speed, e.g. by a PI control loop 32. The desired speed for this loop is derived from the instrument encoder 5 position value, e.g. by a PID control loop 31 to achieve a desired commanded position value 49 that is provided by the surveying instrument 1, e.g. by a trajectory controller.

For example, a drive with FOC can be installed on the main axis of a terrestrial Total-Station or a terrestrial Laser-Scanner as surveying instrument 1 over a gear or as a direct drive (refer to variant drawings below). The FOC 30 can therein be realized with a microcontroller, an FPGA, System on Chip or an integrated circuit. The angle of the motor rotor is measured with a sensor 9 on the motor axis 7. The induced magnet vector in the motor 8 is applied in the corresponding direction and strength, which is the core of the FOC 30, while the energy consumption is controlled over the current and the corresponding current-sense resistor 46a, 46b. The stepper drive 18 is powered over a dual H-bridge power amplifier. The current 46a, 46b can therein measured in the H-bridge (in series to the stepper drive coil 8a, 8b), to detect positive and negative currents.

The FOC can be implemented as a fast position control loop with current control and motor axis position control. On top of the FOC 30, a speed or positioning control of the device angle is implemented which can be much slower, because of the high reliability of the FOC 30 and its accuracy of the motor axis angle 9.

The angle 9 of the rotor can e.g. be measured with high resolution (>10 bit), high sampling frequency (>2 kHz) and very low dead-time to implement an efficient FOC 30.

In an example of an embodiment of the field oriented control and its transformation according to the present invention concerns a principle of field oriented control (FOC) of a 2 phase brushless permanent magnet stepper motor drive. A main difference a to FOC of a 3 phase PMSM is, that with a 2-phase drive, the signals of the phases are 90° phase-shifted—instead of 120° of 3 phases drive.

For the FOC according to the invention, the angle of the rotor is measured with a sensor direct on the motor axis 7 and this angle is used for the Park-transformation to get the so-called quadrature current used to control the torque applied to the rotor.

In an advanced embodiment according to the Invention the velocity and/or position loop of the shown diagram can also be configured to use a feedback of a combination of the instrument encoder and the motor encoder readings, which is configured to avoid controller windup. In the shown embodiment, a triggering of the slipping clutch could lead to a windup of the control loop as the motor moves but instrument axis is not moved correspondingly. Besides implementing classical anti-windup configurations in the control loop, a specific solution according to the present invention can also use a combined feedback of both of the motor encoder and the instrument encoder as feedback for the speed loop and/or the position loop—as indicated by the optional dotted line 45. In a first step, a speed loop with a feedback from the motor-encoder alone or with a combination of motor and instrument encoder can bring advantage. Such a combination can detect a slip clutch triggering by considering the gear reduction and configure a control loop output that avoids an integral windup that leads to an undesired behavior of the instrument axis, e.g. in an overshoot or excessive power consumption and/or wear. Also, a warning signal can be provided in such a case of detection of a triggering of the slipping clutch.

Figure 5:
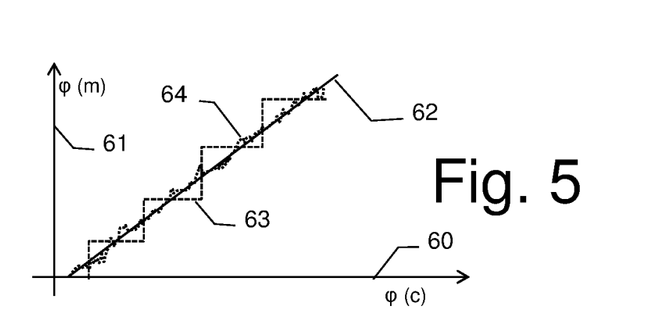
FIG. 5 shows an example of a motor movement according to the invention.

FIG. 5 illustrates a comparison of the motor axis 7 movement with the FOC that forms a substantial straight line 62 of the commanded 60 and the measured 61 angular position of the instrument axis 2,3, in comparison to a full or half-step stair function 63 or to an undefined wiggly line of a micro-stepping driver 64.

Figure 6:
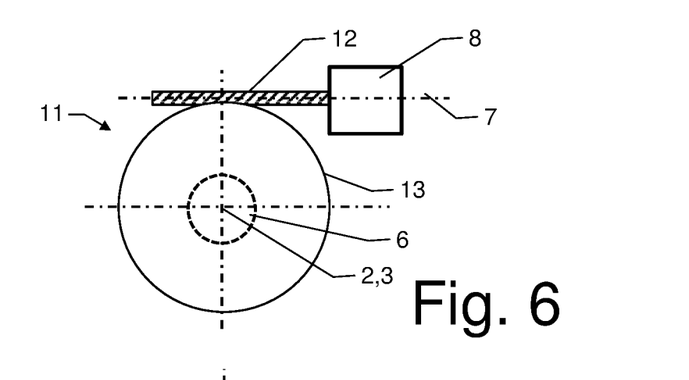
FIG. 6 shows an example of an embodiment of a first drive configuration according to the invention.
Figure 7:
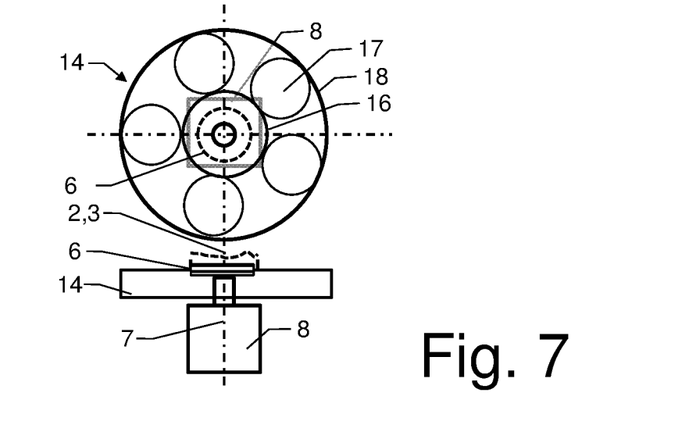
FIG. 7 shows an example of an embodiment of a second drive configuration according to the invention.
Figure 8:
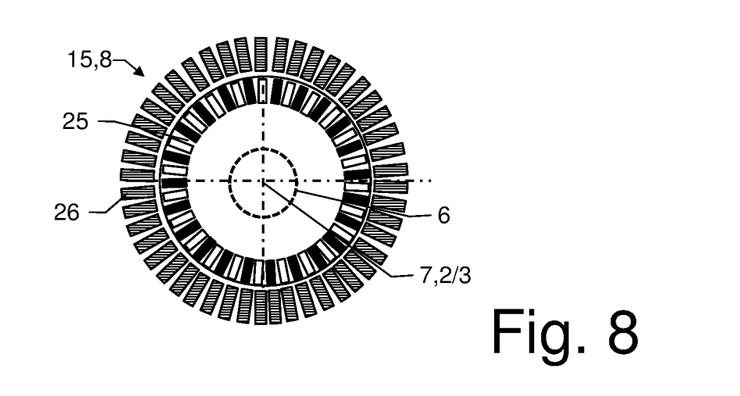
FIG. 8 shows an example of an embodiment of a third drive configuration according to the invention.

In FIGS. 6, 7 and 8 an example of an embodiment of the present invention is shown, in which the specific mechanical motor-axis construction is variated.

Regarding the mechanical setup of an axis drive in a surveying instrument 1 according to the invention, FIG. 6 shows a preferred embodiment, in which worm gear drive transmission 11 is implemented in-between the motor axis 7 of the FOC-stepper motor 8. It comprises a worm shaft 12 directly linked to the motor axis 7 which meshes with a gear wheel 13 at the instrument axis 2,3. Therein the moved part of the instrument and the gear wheel 13 are interlinked by a slipping clutch 6. In the example shown, the slipping clutch 6 is embodied as a coaxial slipping clutch, e.g. as a friction clutch or with a magnetic coupling at the output of the worm wheel that is linked to the moved instrument portion, which portion is sensed by the instrument encoder. Besides a worm gear, also a planetary gear could be used as a similar embodiment according to the invention, which is providing a similar self-locking effect, in particular at high gear ratios of about 1:30 or more.

The alternative embodiment according to the invention of FIG. 7 shows the FOC stepper motor 8 interlinked with a coaxial gear reduction 14 in-between the motor axis 7 and the instrument axis 2,3 embodied as a planetary drive or epicyclic gearing in a front and top view. The motor 8 is linked to the solar wheel 16 that drives the planetary wheels 17 against the static outer ring 18, so that a cage holding the planetary wheels 17 is moved as output to which the instrument axis is linked. The slipping clutch 6 is be arranged in-between the slow output of the epicyclic gearing and the moved instrument portion and arranged and configured in such a way, that there will be a slipping if the transferred torque exceeds a defined limit which would potentially cause damage or to the instrument 1.

In an alternative embodiment shown in FIG. 8, the stepper motor 8 is optionally configured as a direct drive unit 15,8 in which the motor axis 7 coincides with the instrument axis 2,3. In such an embodiment, an effect of a slipping clutch can be derived by an accordingly configured magnetic coupling within the stepper motor itself, e.g. in such a way that the pull-torque of the stepper motor 8 is configured in such a way to be a torque limit of the movement of the instrument axis. In other words, the slipping clutch can be embodied by a loss of steps of the stepper motor, in particular in its magnetic coupling in-between rotor and stator. Dependent on the configuration of the device, the (here inner) permanent magnet motor portion 25 can be configured as the stator and the (here outer) coil portion 26 can be the rotor, e.g. with the permanent magnets in the instrument base and the coils in the moved upper instrument portion that comprises the electronics—or the other way round in another embodiment, preferably wherein the coil portion is arranged at the instrument portion which comprises the electronics and/or the power supply. Such a magnetic coupling, in particular in-between permanent magnets can in general be used as a slipping clutch configuration, also in other embodiments. What is rather special in such an embodiment, is the fact that there can still be a faster and lower resolution encoder reading as a motor encoder 9 for the FOC—plus additionally a (in comparison) slower and higher resolution encoder reading as instrument encoder 5 for deriving measurement values if the instrument, that is also used for positioning of the instrument axis 2,3 by the motor, in particular established by two physically different and separate encoders 9 and 5. In another embodiment, such can be established by a specifically designed single encoder unit, providing a faster low-res output values as well as a slower high-res output of its angular readings from the single encoder unit, e.g. by two separate signal evaluation paths for the physical readouts of the encoder.

Figure 9:
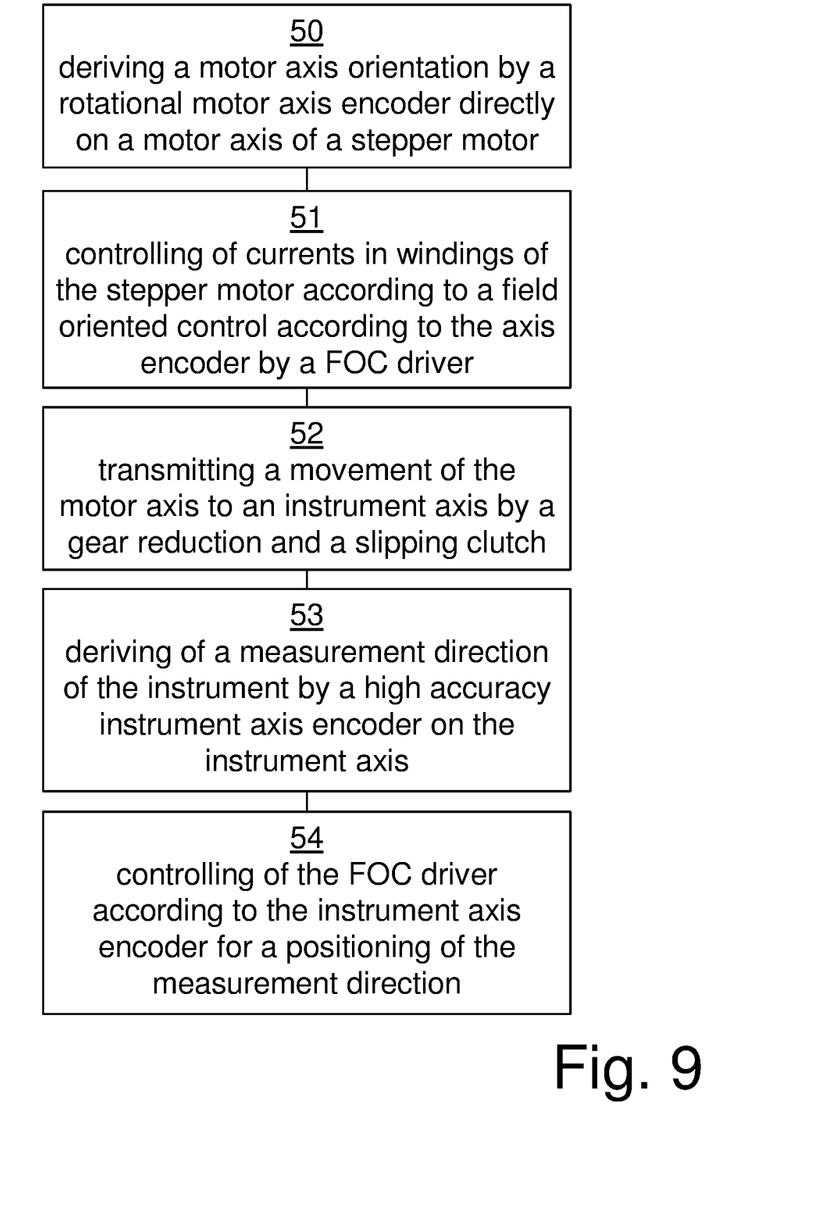
FIG. 9 shows an example of a simplified flow diagram of an embodiment of the present invention.

FIG. 9 shows an example of a simplified flow diagram of an embodiment of the present invention.

Box 50 symbolizes a deriving of a motor axis orientation by a rotational motor axis encoder directly on a motor axis of a stepper motor.

Box 51 symbolizes a controlling of phase currents of the stepper motor according to a field oriented control according to the axis encoder by a FOC driver.

Box 52 symbolizes a transmitting a movement of the motor axis to an instrument axis by a gear reduction and a slipping clutch.

Box 53 symbolizes a deriving of a measurement direction of the instrument by a high accuracy instrument axis encoder on the instrument axis.

Box 54 symbolizes a controlling of the FOC driver according to the instrument axis encoder for a positioning of the measurement direction.

In an optional embodiment the positioning can comprise an evaluation of a mixed feedback from the motor encoder and the instrument encoder which is configured to avoid controller windup in case of a triggering of the slipping clutch.

A skilled person is aware of the fact that details, which are here shown and explained with respect to different embodiments, can also be combined with details from other embodiments and in other permutations in the sense of the invention.

What is claimed is:

1. A geodetic surveying instrument, configured to move a measurement light beam into a desired measurement direction in space, the geodetic surveying instrument comprising:
at least one movement axis which is motorized for providing a positioning of the measurement direction of the geodetic surveying instrument;
an instrument-encoder at the movement axis configured for deriving the measurement direction as a measurement value of the geodetic surveying instrument; and
a transmission link of the movement axis of the geodetic surveying instrument to a motor axis of a stepper motor, wherein the transmission link is configured with a gear reduction and a slipping clutch arrangement, and
wherein the stepper motor comprises a rotational motor-encoder on its motor-axis and is driven by a motor controller that provides a field oriented control of phase currents of the stepper motor, which field orientation is derived based on the rotational motor-encoder, wherein the gear reduction is configured as a worm gear drive or as a planetary gear drive.

2. The geodetic surveying instrument according to claim 1, wherein the gear reduction is configured as a substantially self-locking transmission.

3. The geodetic surveying instrument according to claim 1, wherein the instrument-encoder is a high accuracy rotational encoder with a resolution of at least one arc second or below, configured with an evaluation unit comprising a positional error compensation and evaluation unit.

4. The geodetic surveying instrument according to claim 1, wherein the field oriented control is a cascaded controller comprising:
a field oriented current controller for driving the phase currents of the stepper motor based on current sensors for the phase currents and on the motor-encoder, that is cascaded under a control input from a speed loop controller based on the instrument-encoder of the movement axis, that is cascaded under a control input from a position loop controller based on the instrument-encoder of the movement axis,
wherein a position loop controller is provided with a desired trajectory of movement from a geodetic measurement controller of the geodetic surveying instrument.

5. A geodetic surveying instrument, configured to move a measurement light beam into a desired measurement direction in space, the geodetic surveying instrument comprising:
at least one movement axis which is motorized for providing a positioning of the measurement direction of the geodetic surveying instrument;
an instrument-encoder at the movement axis configured for deriving the measurement direction as a measurement value of the geodetic surveying instrument; and
a transmission link of the movement axis of the geodetic surveying instrument to a motor axis of a stepper motor,
wherein the transmission link is configured with a gear reduction and a slipping clutch arrangement, and
wherein the stepper motor comprises a rotational motor-encoder on its motor-axis and is driven by a motor controller that provides a field oriented control of phase currents of the stepper motor, which field orientation is derived based on the rotational motor-encoder,
wherein the stepper motor is a bipolar two phase stepper motor and the field oriented control is provided as two phase field-oriented control (FOC) controller unit.

6. A geodetic surveying instrument, configured to move a measurement light beam into a desired measurement direction in space, the geodetic surveying instrument comprising:
at least one movement axis which is motorized for providing a positioning of the measurement direction of the geodetic surveying instrument;
an instrument-encoder at the movement axis configured for deriving the measurement direction as a measurement value of the geodetic surveying instrument; and
a transmission link of the movement axis of the geodetic surveying instrument to a motor axis of a stepper motor,
wherein the transmission link is configured with a gear reduction and a slipping clutch arrangement, and
wherein the stepper motor comprises a rotational motor-encoder on its motor-axis and is driven by a motor controller that provides a field oriented control of phase currents of the stepper motor, which field orientation is derived based on the rotational motor-encoder,
wherein the rotational motor-encoder is configured with a rotational resolution that is higher than a steps per revolution count of the stepper motor.

7. A geodetic surveying instrument, configured to move a measurement light beam into a desired measurement direction in space, the geodetic surveying instrument comprising:
at least one movement axis which is motorized for providing a positioning of the measurement direction of the geodetic surveying instrument;
an instrument-encoder at the movement axis configured for deriving the measurement direction as a measurement value of the geodetic surveying instrument; and
a transmission link of the movement axis of the geodetic surveying instrument to a motor axis of a stepper motor,
wherein the transmission link is configured with a gear reduction and a slipping clutch arrangement, and
wherein the stepper motor comprises a rotational motor-encoder on its motor-axis and is driven by a motor controller that provides a field oriented control of phase currents of the stepper motor, which field orientation is derived based on the rotational motor-encoder
wherein an electronics printed circuit board (PCB) is directly mechanically attached to an end face of the stepper motor, which electronics PCB comprises a motor driver power electronics and a motor controller unit comprising at least control loops for the field oriented control of the stepper motor.

8. The geodetic surveying instrument according to claim 7, wherein the electronics PCB mechanically comprises at least a portion of the rotational motor-encoder.

9. A geodetic surveying instrument, configured to move a measurement light beam into a desired measurement direction in space, the geodetic surveying instrument comprising:
at least one movement axis which is motorized for providing a positioning of the measurement direction of the geodetic surveying instrument;
an instrument-encoder at the movement axis configured for deriving the measurement direction as a measurement value of the geodetic surveying instrument; and
a transmission link of the movement axis of the geodetic surveying instrument to a motor axis of a stepper motor,
wherein the transmission link is configured with a gear reduction and a slipping clutch arrangement, and
wherein the stepper motor comprises a rotational motor-encoder on its motor-axis and is driven by a motor controller that provides a field oriented control of phase currents of the stepper motor, which field orientation is derived based on the rotational motor-encoder
wherein the rotational motor-encoder is a magnetic angular encoder or an optical angular encoder or a capacitive angular encoder with a code-disk attached to the motor-axis.

10. A method for driving a movement axis of a geodetic surveying instrument, the method comprising:
deriving a motor axis orientation by a rotational motor axis encoder on a motor axis of a stepper motor;
controlling phase currents of the stepper motor according to a field oriented control according to the axis encoder by a FOC driver;
transmitting a movement of the motor axis to an instrument axis by a gear reduction and a slipping clutch;
deriving a measurement direction of the instrument by an instrument axis encoder on the instrument axis; and
controlling the FOC driver according to the instrument axis encoder for a positioning of the measurement direction.

11. The method according to claim 10, wherein the transmitting of a movement of the motor axis to an instrument axis is provide with a gearing down of a movement speed of the motor axis to the instrument axis by a worm gear drive.

12. The method according to claim 10, wherein the FOC driver is a two phase FOC driver and controlling of the field-oriented control (FOC) driver is cascaded under a speed loop and position loop, which are based on readings from an instrument axis encoder at the instrument movement axis that is separated from the motor encoder at the motor axis, or which are based on readings from a combination of the instrument axis encoder and the motor encoder.

* * * * *